(12) United States Patent
Regenberg et al.

(10) Patent No.: US 8,801,882 B2
(45) Date of Patent: Aug. 12, 2014

(54) TORSION SONOTRODE AND ULTRASONIC WELDING PROCESS USING A TORSION SONOTRODE

(75) Inventors: Claus Regenberg, Zirndorf (DE); Georg Lang, Triefenstein (DE)

(73) Assignee: Telsonic Holding AG, Bronschhofen (CH)

( * ) Notice: Subject to any disclaimer, the term of this patent is extended or adjusted under 35 U.S.C. 154(b) by 0 days.

(21) Appl. No.: 13/808,025

(22) PCT Filed: Jul. 6, 2011

(86) PCT No.: PCT/EP2011/061363
§ 371 (c)(1),
(2), (4) Date: Jan. 17, 2013

(87) PCT Pub. No.: WO2012/007325
PCT Pub. Date: Jan. 19, 2012

(65) Prior Publication Data
US 2013/0139955 A1    Jun. 6, 2013

(30) Foreign Application Priority Data
Jul. 12, 2010   (DE) .......................... 10 2010 031 258

(51) Int. Cl.
| | | |
|---|---|---|
| *B32B 37/00* | (2006.01) | |
| *B29C 65/08* | (2006.01) | |
| *B06B 3/00* | (2006.01) | |
| *B29C 65/00* | (2006.01) | |

(52) U.S. Cl.
CPC ................. *B29C 65/082* (2013.01); *B06B 3/00* (2013.01); *B29C 66/81433* (2013.01)
USPC ..................................... 156/73.1; 156/580.2

(58) Field of Classification Search
USPC .............. 156/73.1, 308.2, 308.4, 553, 580.1, 156/580.2; 264/442, 443, 444, 445; 425/174.2; 228/110.1, 1.1; 310/323.01, 310/323.18
See application file for complete search history.

(56) References Cited

U.S. PATENT DOCUMENTS

| | | | | |
|---|---|---|---|---|
| 4,681,645 A | * | 7/1987 | Fukushima et al. | 156/73.1 |
| 4,767,492 A | * | 8/1988 | Fukusima et al. | 156/580.2 |
| 4,956,213 A | | 9/1990 | Masuda | |
| 6,802,920 B2 | * | 10/2004 | Shinohara et al. | 156/73.1 |
| 2010/0078115 A1 | * | 4/2010 | Lang | 156/73.1 |
| 2010/0326586 A1 | * | 12/2010 | Moeglich | 156/73.3 |

FOREIGN PATENT DOCUMENTS

| | | |
|---|---|---|
| EP | 0242480 | 10/1987 |
| EP | 1410988 | 4/2004 |
| EP | 1685919 | 8/2006 |
| EP | 1930148 | 6/2008 |

OTHER PUBLICATIONS

PCT, "International Search Report for PCT/EP2011/061363", Jan. 18, 2012.

* cited by examiner

*Primary Examiner* — James Sells
(74) *Attorney, Agent, or Firm* — Manabu Kanesaka

(57) ABSTRACT

The invention relates to a torsion sonotrode (S) having a contact surface (1, 1') for transferring a torsional oscillation directed about a torsion axis (T) onto a component (4) to be welded. To ensure that the welded joint has a uniform strength, it is proposed according to the invention that the contact surface (1, 1') has a flat stop surface (2, 2') which runs substantially perpendicular to the torsion axis (T) and from which elevations (3, 3') of insular design extend with a pointed form.

10 Claims, 3 Drawing Sheets ism Sonotrode and Ultrasonic Welding Process Using a Torsion Sonotrode

RELATED APPLICATIONS

The present application is National Phase of International Application No. PCT/EP2011/061363 filed Jul. 6, 2011, and claims priority from German Application No. 10 2010 031 258.4, filed Jul. 12, 2010.

The invention relates to a torsion sonotrode according to the first aspect. It further relates to an ultrasonic welding process using such a torsion sonotrode.

A torsion sonotrode of this type is known from EP 1 410 988 A1, for example. According thereto, a contact surface for transferring a torsional oscillation directed about a torsion axis onto a component to be welded is provided with linear notches. The notches have a V-shaped notch base; they can be embodied in the form of a grid.

In the use of such a torsion sonotrode, the problem occasionally arises that a portion of the energy to be transmitted onto the component is lost. As a result, it is possible that the component cannot be welded onto a further component with the desired strength. Furthermore, it is possible that the component welds to the contact surface on the surface thereof opposite the contact surface or that the surface of the component melts.

The object of the invention is to eliminate the disadvantages of the prior art. In particular, a torsion sonotrode shall be provided, with which welded joints having a reproducible strength can be produced. According to a further object of the invention, an ultrasonic welding process shall be provided, by way of which welded joints having constant strength can be produced.

This object is attained by the features of first and eleventh aspects. Advantageous embodiments of the invention will become apparent from the features of second to tenth and twelfth aspects.

According to the invention, the contact surface has a flat stop surface extending substantially perpendicular to the torsion axis and from which projections of insular design extend with a pointed shape. Excellent transmission of ultrasonic oscillation energy from the contact surface onto the component is thereby achieved. The insular and pointed projections are pressed into the component by way of the welding pressure used in ultrasonic welding, thereby resulting in a positive connection between the contact surface and the component. The flat stop surface provided between the projections and extending perpendicular to the torsion axis results in a defined penetration depth of the projections into the component. It is thereby possible to produce ultrasonic welded joints having constant strength.

According to an advantageous embodiment, a distance between two adjacent projections is 0.4 to 2.0 mm, preferably 0.5 to 1.0 mm. That is, the projections—in contrast to the prior art—are separated from one another, not by notches having a V-shaped notch base, but by flat sections of the stop surface. It is thereby ensured that the projections will penetrate the component entirely.

Advantageously, a total base area of all projections is less than the stop surface. The term "total base area" is intended to mean the sum of the bases of the projections. The base of a projection is delineated by the line(s) of intersection of the lateral surface(s) bordering the projection with the stop surface. A ratio of stop surface to total base area can be in the range of 1.1 to 8.0, preferably in the range of 2.0 to 5.5. In respect of the distribution of the projections on the contact surface, it has proven advantageous that these are disposed along at least two straight lines intersecting at a specified angle. The straight lines can intersect at a specified angle of 30 to 90°, preferably 60 or 90°. According to an alternative embodiment of the invention, the projections can also be disposed with respect to the torsion axis along radially extending straight lines.

It has proven particularly advantageous that the projections have a pyramidal shape. The projections can have the shape of a three- or four-sided pyramid in particular. In this case a base of a projection therefore is a triangle or a quadrangle, more particularly an equilateral triangle or a square.

In addition, it has proven advantageous that the pyramidal surfaces of the pyramids form an angle of inclination with the stop surface of 50 to 80°, preferably 65 to 75°. That is, the pyramids are advantageously delimited by relatively steep pyramidal surfaces.

According to a further embodiment of the invention, an ultrasonic welding process is provided, which has the following steps:

provide a torsion sonotrode according to the invention,
press the projections into a section of a component to be welded, said section touching the contact surface, until the stop surface rests on the component, wherein a maximum height of the projections is less than a thickness of the section of the component touching the contact surface, and
weld the component by way of torsion ultrasonic welding to a further component in contact therewith.

According to the method according to the invention, upon application of welding pressure, the projections penetrate the component only to a depth defined by the maximum height of the projections relative to the stop surface. The penetration depth is less than the thickness of the section of the component to be welded, said section touching the contact surface. Therefore, the projections do not pass through the component. In particular, these do not extend into the region of a weld contact area between the component and the further component.

Advantageously, the maximum height of the projections is less than 0.5-fold the thickness of the component to be welded. That is, upon application of welding pressure, the projections penetrate the component to be welded by no more than half the thickness thereof.

Exemplary embodiments of the invention are described in greater detail in the following by reference to the drawings. Shown are:

Figure 1:
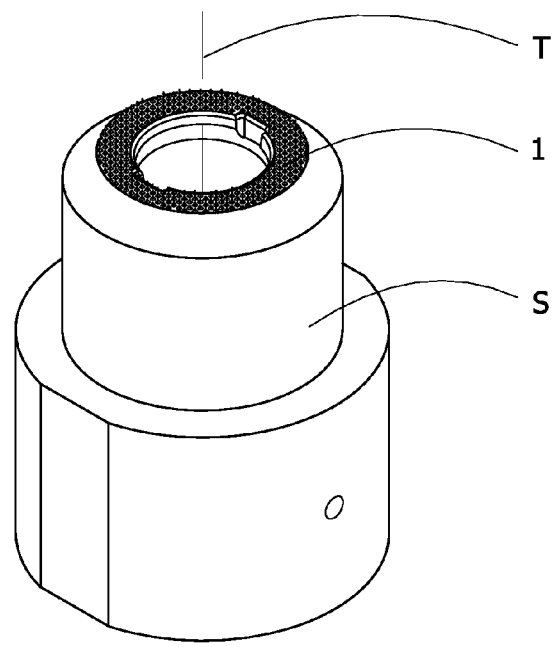
FIG. 1 shows a perspective view of a first torsion sonotrode.
Figure 2:
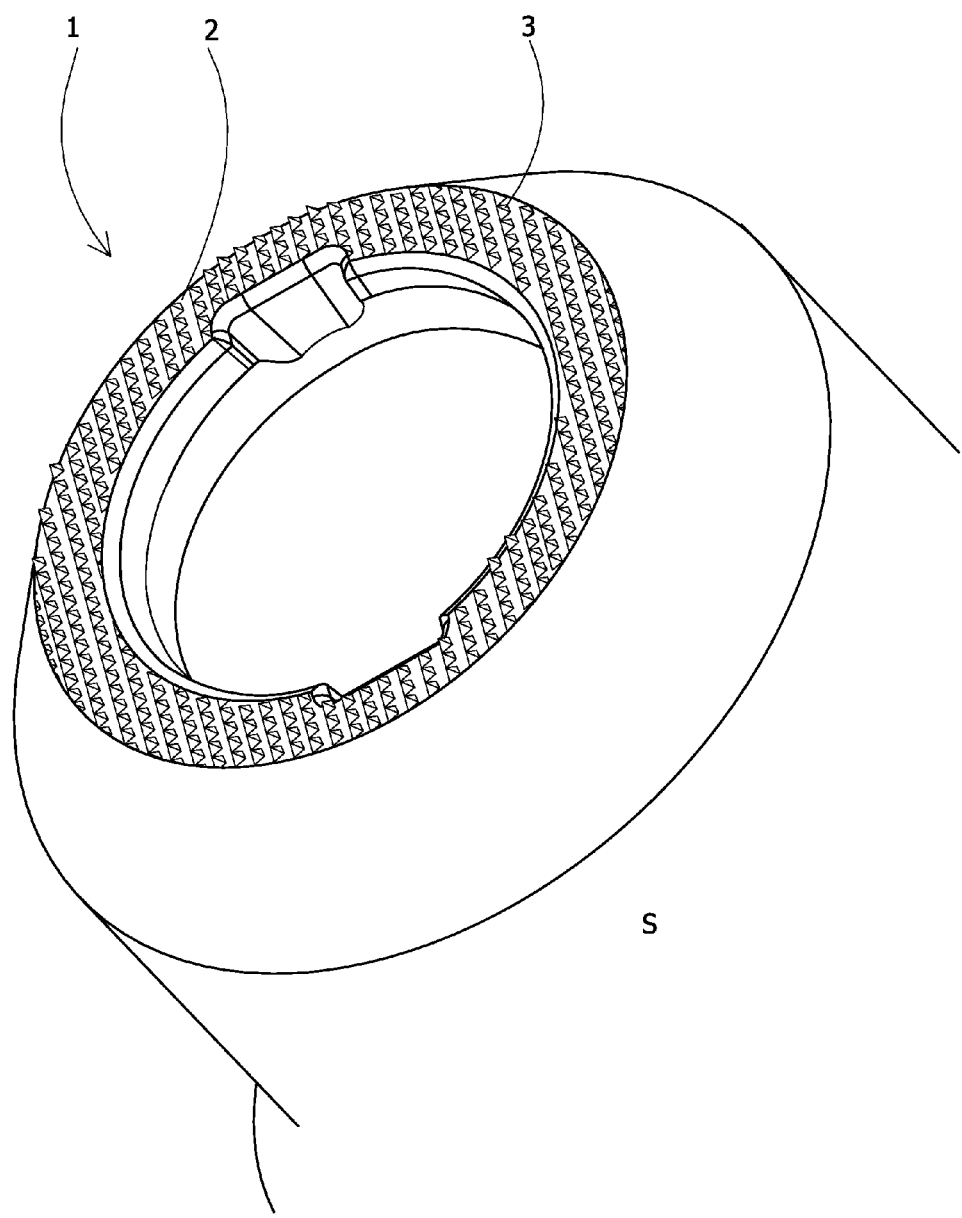
FIG. 2 shows an enlarged detailed view according to FIG. 1.
Figure 3:
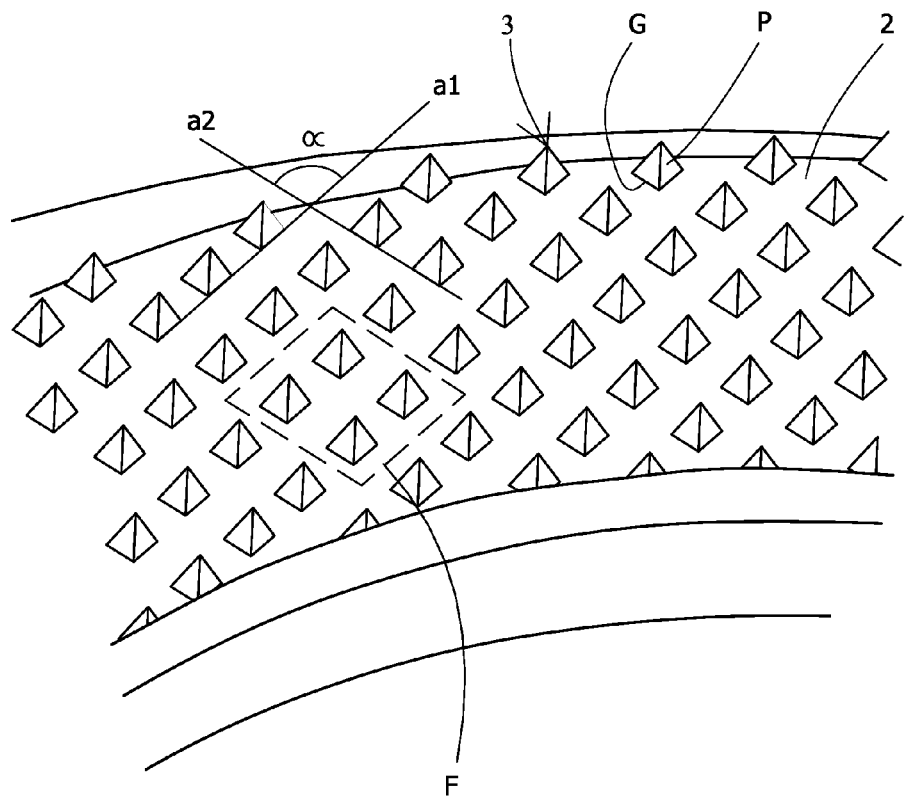
FIG. 3 shows an enlarged section according to FIG. 2.

FIGS. 1 to 3 show views of a first torsion sonotrode S, which has a substantially annular contact surface 1. The contact surface 1 is largely rotationally symmetrical with respect to a torsion axis labeled with reference sign T and about which the torsion sonotrode S oscillates back and forth during operation. As shown in FIG. 2 in particular, the contact surface 1 is formed by a flat stop surface 2 extending perpendicular to the torsion axis T and insular projections 3 extending therefrom. The projections 3 are advantageously produced integrally with the torsion sonotrode S. The projections 3 can be produced via milling or grinding.

As shown in FIG. 3, the pointed projections 3 are formed by four-sided pyramids. A first edge of a base G of the pyramids extends parallel to a first straight line a1. A second edge of the base G extends parallel to a second straight line a2. The first and the second straight lines a1, a2 intersect in this case at an angle α of 90°. The straight lines A1, A2 advantageously extend parallel to one another. Advantageously, a distance between two adjacent parallel straight lines A1, A2 is always equal. In particular, it is advantageous that a distance between the parallel straight lines A1 and A2 is greater than a length of a base line delimiting the base of the pyramids.

As shown in particular by way of the field F delimited by dashed lines, a sum of the base G or a total base area of four pyramids located in the field F is much smaller than the section of the stop surface 2 enclosing same. In the present example, the ratio of total base area to stop surface 2 is approximately 1:5. In this case, pyramidal surfaces P of the pyramids form an angle of inclination with the stop surface 2 of 65 to 75°.

Figure 4:
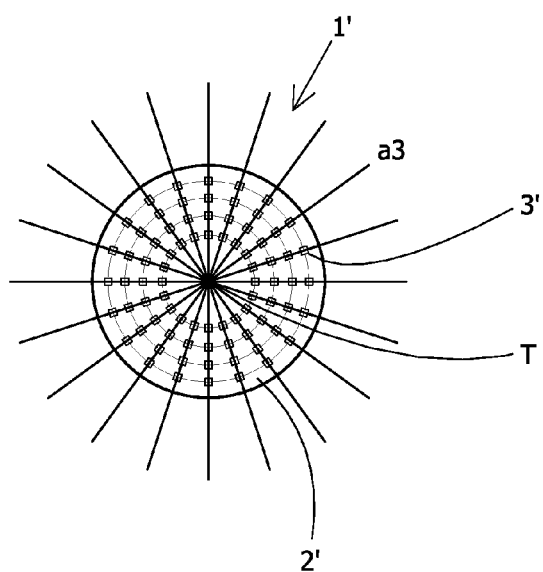
FIG. 4 shows, schematically, the arrangement of projections in a second torsion sonotrode

FIG. 4 shows a top view of a further contact surface 1' of a second torsion sonotrode. The further contact surface 1' is round. A stop surface is labeled here with reference sign 2'. Projections 3' extending from the stop surface 2' lie on straight lines a3 oriented radially in this case with respect to the torsion axis T.

The projections 3, 3' can also be embodied as three-sided pyramids or can have a conical shape.

The function of the proposed torsion sonotrode will now be explained in greater detail with reference to FIG. 5.

Figure 5:
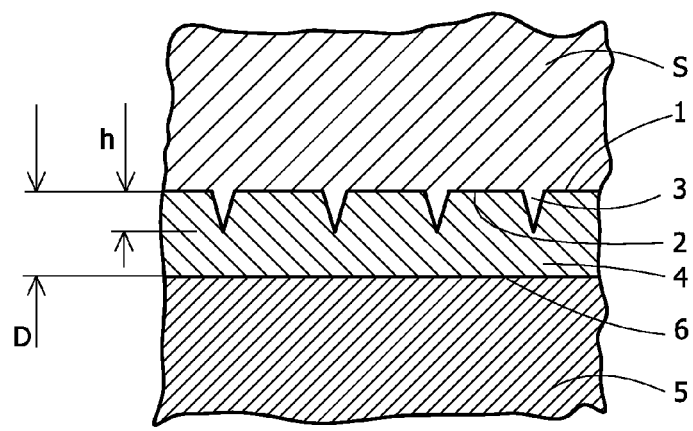
FIG. 5 shows a sectional view of a torsion sonotrode in contact with a component.

In FIG. 5, the contact surface 1 of the torsion sonotrode S rests on a component 4 to be welded. The component can be made of plastic or metal, in particular aluminum, for example. Reference sign 5 labels a further component, which will be welded to the component 4. The further component can also be made of plastic or metal, in particular aluminum.

As shown in FIG. 5, upon application of the welding pressure required to produce an ultrasonic weld joint, the projections 3 penetrate the component 4 until the stop surface 2 rests on the component 4. A maximum penetration depth of the projections 3 is defined by a height h between the stop surface 2 and the tip of the projections 3. The height h is less than a thickness D that the component 4 has in the region of the contact surface 1. That is, in the region of the contact surface 1, the projections 3 therefore only penetrate the component 4. However, said projections do not pass through the component 4 to a weld contact area 6 opposite the contact surface 1, which is located between the component 4 and the further component 5.

Due to the insular embodiment of the pointed projections 3 and the flat stop surface 2 provided therebetween, the projections 3 always penetrate the component 4 to the same depth upon application of welding pressure. Reproducible, positive contact between the torsion sonotrode S and the component 4 is therefore produced. It is therefore ensured that the power transmitted by the torsion sonotrode S onto the component 4 is introduced largely completely into the weld contact area 6. A weld contact area 6 having reproducible strength therefore forms.

LIST OF REFERENCE SIGNS 1, 1' contact surface
2, 2' stop surface
3, 3' projection
4 component
5 further component 6 weld contact area
a1, a2, a3 straight line
D thickness
F field
G base
h height
P pyramidal surfaces
S torsion sonotrode
T torsion axis

The invention claimed is:

1. A torsion sonotrode comprising:
a contact surface for transferring a torsional oscillation directed about a torsion axis onto a component to be welded,
wherein the contact surface has a flat stop surface extending substantially perpendicular to the torsion axis and projections extending from the flat stop surface and having a pointed shape,
said projections are spaced apart from one another by flat sections of the stop surface, and a ratio of the stop surface to a total base area of all the projections is in a range of 2.0 to 5.5.

2. The torsion sonotrode according to claim 1, wherein a distance between two adjacent projections is 0.4 to 2.0 mm.

3. The torsion sonotrode according to claim 1, wherein the projections are disposed along at least two straight lines intersecting at a predetermined angle.

4. The torsion sonotrode according to claim 3, wherein the predetermined angle is 30° to 90°.

5. The torsion sonotrode according to claim 1, wherein the projections are disposed with respect to the torsion axis along radially extending straight lines.

6. The torsion sonotrode according to claim 1, wherein the projections have a shape of a three- or four-sided pyramid.

7. The torsion sonotrode according to claim 6, wherein pyramidal surfaces of the pyramid form an angle of inclination with the stop surface of 50° to 80°.

8. An ultrasonic welding process comprising the following steps:
providing the torsion sonotrode according to claim 1,
pressing the projections into a section of the component to be welded, said section contacting the contact surface, until the stop surface rests on the component, wherein a maximum height of the projections is less than a thickness of the section of the component contacting the contact surface, and
welding the component by way of torsion ultrasonic welding to a further component in contact therewith.

9. The ultrasonic welding process according to claim 8, wherein the maximum height of the projections is less than 0.5-fold the thickness of the component to be welded.

10. The torsion sonotrode according to claim 1, wherein the contact surface has an annular shape,
the projections have a shape of a three- or four-sided pyramid with three or four sides on the contact surface,
the projections spaced apart from one another are arranged on the contact surface so that the projections spaced apart from one another form plural linear lines equally spaced apart from each other and arranged in parallel,
one side of each pyramid in one linear line is arranged linearly along said one linear line, and
another side of each pyramid in said one linear line is arranged linearly along another linear line arranged to intersect with said one linear line.

* * * * *